(12) United States Patent
Yoshida

(10) Patent No.: US 8,612,642 B2
(45) Date of Patent: Dec. 17, 2013

(54) INFORMATION PROCESSING APPARATUS AND CONTROL METHOD THEREOF

(75) Inventor: Toru Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 12/819,934

(22) Filed: Jun. 21, 2010

(65) Prior Publication Data
US 2010/0332691 A1 Dec. 30, 2010

(30) Foreign Application Priority Data

Jun. 24, 2009 (JP) .................. 2009-149801

(51) Int. Cl.
*G06F 3/00* (2006.01)
*G06F 9/00* (2006.01)

(52) U.S. Cl.
USPC .......... 710/16; 710/15; 710/17; 710/18; 710/19; 713/1; 713/2; 713/100

(58) Field of Classification Search
None
See application file for complete search history.

(56) References Cited

U.S. PATENT DOCUMENTS

| | | | | |
|---|---|---|---|---|
| 5,548,782 A * | 8/1996 | Michael et al. | ................. | 710/15 |
| 6,189,050 B1 * | 2/2001 | Sakarda | ................. | 710/18 |
| 6,578,099 B1 * | 6/2003 | Bassman et al. | ................. | 710/301 |
| 6,745,330 B1 * | 6/2004 | Maillot | ................. | 726/35 |
| 6,910,142 B2 * | 6/2005 | Cross et al. | ................. | 713/324 |
| 6,934,774 B1 * | 8/2005 | Sundaram et al. | ................. | 710/19 |
| 7,882,475 B2 * | 2/2011 | Alpert et al. | ................. | 716/119 |
| 2003/0088318 A1 * | 5/2003 | Edogawa et al. | ................. | 700/1 |
| 2004/0177180 A1 * | 9/2004 | Robbin et al. | ................. | 710/72 |
| 2006/0206648 A1 * | 9/2006 | Gupta et al. | ................. | 710/302 |
| 2007/0023499 A1 * | 2/2007 | Wurzburg et al. | ................. | 235/376 |
| 2007/0028009 A1 | 2/2007 | Robbin et al. | | |
| 2008/0077725 A1 * | 3/2008 | Yabuki | ................. | 710/305 |
| 2008/0126595 A1 * | 5/2008 | Davis et al. | ................. | 710/19 |
| 2009/0276546 A1 * | 11/2009 | Lui et al. | ................. | 710/16 |
| 2010/0169511 A1 * | 7/2010 | Dunstan et al. | ................. | 710/16 |
| 2010/0241889 A1 * | 9/2010 | Fu et al. | ................. | 713/324 |
| 2010/0262726 A1 * | 10/2010 | Tauscher et al. | ................. | 710/16 |

FOREIGN PATENT DOCUMENTS

| | | |
|---|---|---|
| JP | 2003-131956 A | 5/2003 |
| JP | 2003-141588 A | 5/2003 |
| JP | 2006-157425 A | 6/2006 |
| JP | 2007-034891 A | 2/2007 |
| JP | 2008-500617 A | 1/2008 |
| JP | 2008-027379 A | 2/2008 |

* cited by examiner

*Primary Examiner* — Henry Tsai
*Assistant Examiner* — Jing-Yih Shyu
(74) *Attorney, Agent, or Firm* — Canon USA Inc. IP Division

(57) ABSTRACT

An information processing apparatus includes an interface unit configured to electrically connect with a peripheral device capable of receiving a memory storage medium inserted into the peripheral device and electrically connected thereto, a connection detection unit configured to detect a temporary interruption in the electrical connection between the interface unit and the peripheral device, and a control unit configured to prevent the memory storage medium, once unmounted, from being mounted again after the connection detection unit detects the temporary interruption.

6 Claims, 8 Drawing Sheets

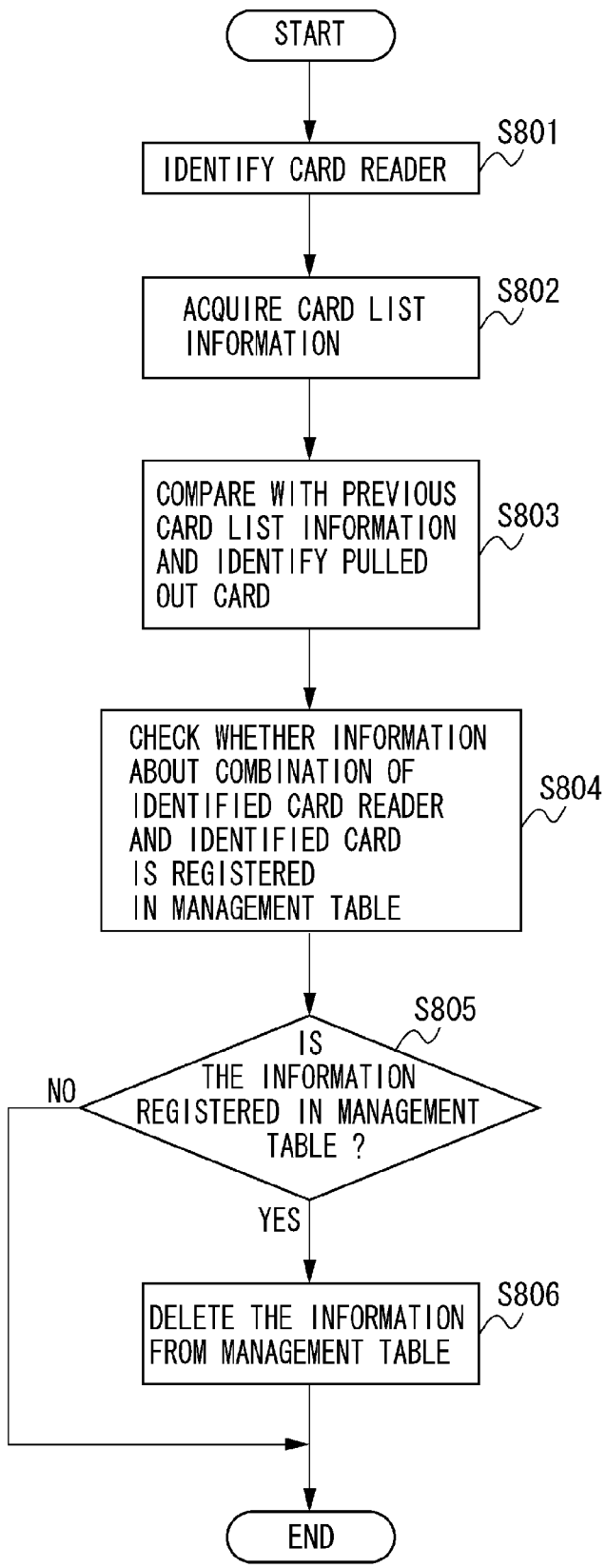

INFORMATION PROCESSING APPARATUS AND CONTROL METHOD THEREOF

BACKGROUND OF THE INVENTION

1. Field of the Invention

The present invention relates to an information processing apparatus capable of connecting to a peripheral device via an interface.

2. Description of the Related Art

Conventionally, a universal serial bus (USB) is employed in connecting a host apparatus with a peripheral device. If noise such as electrostatic noise is generated in the peripheral device connected to the host apparatus via the USB interface, the electrical connection between the host apparatus and the peripheral device may be temporarily disconnected. It thus becomes necessary to shut down and restart the host apparatus. In such a case, Japanese Patent Application Laid-Open No. 2003-131956 discusses shortening the recovery time by rebooting a general interface circuit for transmitting and receiving data between the host apparatus and the peripheral device. Further, Japanese Patent Application Laid-Open No. 2008-27379 discusses rebooting a device control module of the host apparatus to shorten the recovery time.

For example, it is assumed that electrostatic noise is generated in a memory card reader/writer, i.e., an example of a peripheral device, after a memory card inserted into the memory card reader/writer is disconnected(i.e., caused to be in an unusable state). The memory card reader/writer may then cause the card which is in a disconnected state to be in a connected state (i.e., cause the memory card to be usable) again despite a user's intention. In such a case, the connected memory card may be accessed from an information processing apparatus system. However, if the user is unaware that the memory card is connected and pulls out the memory card while the card is being accessed from the system, the data in the memory card may become inconsistent with that stored elsewhere in the apparatus or may become destroyed. Such a case is not considered by conventional techniques.

SUMMARY OF THE INVENTION

The present invention is directed to an information processing apparatus capable of preventing an disconnected device from becoming connected regardless of the user's intention.

According to an aspect of the present invention, an information processing apparatus includes an interface unit configured to connect with a peripheral device capable of loading a storage medium, a first processing unit configured to execute a process for causing the storage medium inserted into the peripheral device connected to the interface unit to be in an unusable state, a connection detection unit configured to detect that the peripheral device is connected to the interface unit, a determination unit configured to determine whether the storage medium which is caused by the first processing unit to be in the unusable state is inserted into the peripheral device detected by the connection detection unit, and a control unit configured to control the first processing unit to cause the storage medium to be in the unusable state according to the determination unit determining that the storage medium which is caused by the first processing unit to be in the unusable state is inserted into the peripheral device.

According to another aspect of the invention there is provided an information processing apparatus comprising: an interface unit configured to connect with a peripheral unit capable of receiving a memory storage medium inserted into the peripheral unit and electrically connected thereto; a connection detection unit arranged to detect an interruption in the connection between the interface unit and the peripheral unit; and a control unit arranged to prevent electrical connection between the peripheral unit and the memory storage medium being reinstated following an interruption in the connection between the interface unit and the peripheral unit.

Preferably the information processing apparatus referenced above further comprises a user interface adapted to receive a request to remove the memory storage medium from the peripheral unit; the control unit being arranged to prevent connection between the peripheral unit and the memory storage medium being reinstated only after a request to remove the memory storage medium has been received via the user interface.

According to an exemplary embodiment of the present invention, a device caused to be in an unusable state can be prevented from becoming usable regardless of the user's intention.

Further features and aspects of the present invention will become apparent from the following detailed description of exemplary embodiments with reference to the attached drawings.

BRIEF DESCRIPTION OF THE DRAWINGS

The accompanying drawings illustrate embodiments, features, and aspects of the invention and, together with the description, serve to explain the principles of the invention.

FIG. 8 is a flowchart illustrating an example of a process performed when a card is pulled out in the digital multifunction peripheral.

DESCRIPTION OF THE EMBODIMENTS

Various embodiments, features, and aspects of the invention will be described in detail below with reference to the drawings.

Figure 1:
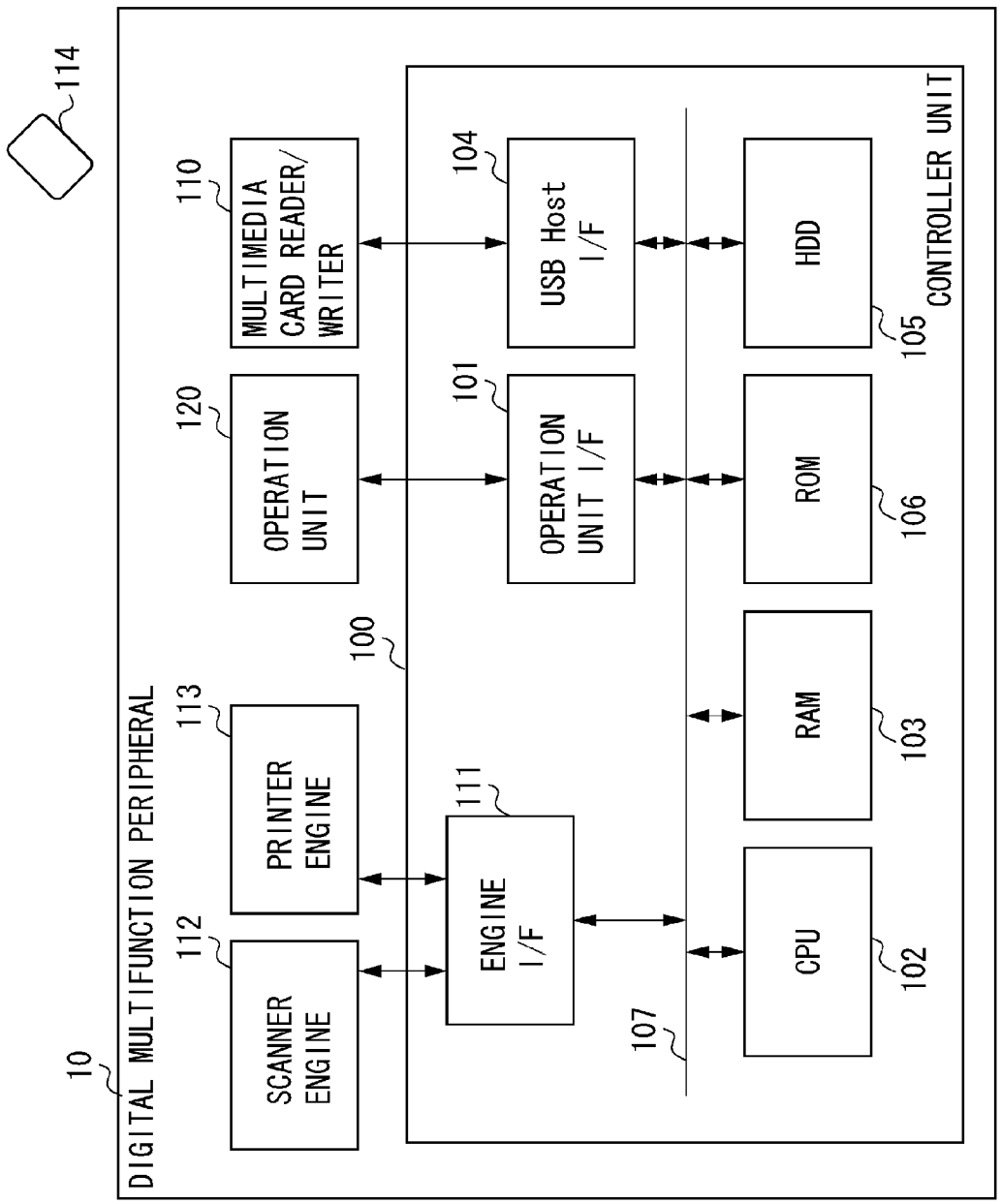
FIG. 1 is a block diagram illustrating an example of a configuration of a digital multifunction peripheral, which is an example of an information processing apparatus.

FIG. 1 is a block diagram illustrating an example of a configuration of a digital multifunction peripheral, which is an example of an information processing apparatus according to a first embodiment of the present invention. Referring to FIG. 1, a digital multifunction peripheral 10 includes a controller unit 100, a multimedia card reader 110 (hereinafter referred to as a card reader 110), a scanner engine 112, a printer engine 113, and an operation unit 120.

The controller unit 100 includes a CPU 102, which launches an operating system (OS) using a boot program stored in a read-only memory (ROM) 106. The CPU 102 then executes application programs stored in a hard disk drive (HDD) 105 under the management of the OS, so that the digital multifunction peripheral 10 performs various processes. The CPU 102 uses a random access memory (RAM) 103 as a work area. The RAM 103 is also used as an image memory area for temporarily storing image data. The HDD 105 stores the application programs and the image data.

A system bus 107 is connected to an operation unit interface (I/F) 101, the CPU 102, the RAM 103, a USB host I/F 104, the HDD 105, the ROM 106, and an engine I/F 111.

The operation I/F 101 is an interface to the operation unit 120 and outputs to the operation unit 120 the image to be displayed thereon. Further, the operation I/F 101 transmits to the CPU 102, information input by the user via a user interface in the form of the operation unit 120. The operation unit 120 includes a display unit such as a liquid crystal display (LCD) and an operating portion such as a touch panel sheet and hard keys.

The USB host I/F 104 is an interface to the card reader 110 which in turn has an interface capable of loading a memory card 114. The USB host I/F 104 transmits commands to the card reader 110 and transmits signals from the card reader 110 to the CPU 102.

The card reader 110 is an example of a USB device that is connectable to the USB host I/F 104. The USB device according to the present embodiment is an example of a peripheral device that is connectable to the information processing apparatus. Examples of the USB device are USB memory, USB HDD, digital camera, audio player, cellular phone, compact disc (CD)/digital versatile disc (DVD) drive, and integrated circuit (IC) card reader.

The card reader 110 has a plurality of slots (not shown) for inserting the memory card 114, i.e., a compact storage medium, and is capable of loading a plurality of types of memory cards. Further, a plurality of memory cards can be simultaneously inserted into the card reader 110. Examples of the memory card are Secure Digital (SD) card, Smart Media, CompactFlash®, memory stick, and micro drive. The card reader 110 reads data from and writes data in the memory card. Furthermore, the card reader 110 may include a USB hub so that USB devices can be further connected to the card reader 110. For example, the USB memory can be connected to the card reader 110.

According to the first embodiment, the card reader 110 is disposed inside the digital multifunction peripheral. The user can load and unload the memory card 114 on and from the card reader 110. However, the user cannot plug and unplug the USB cable which connects the USB host I/F 104 with the card reader 110.

Figure 2:
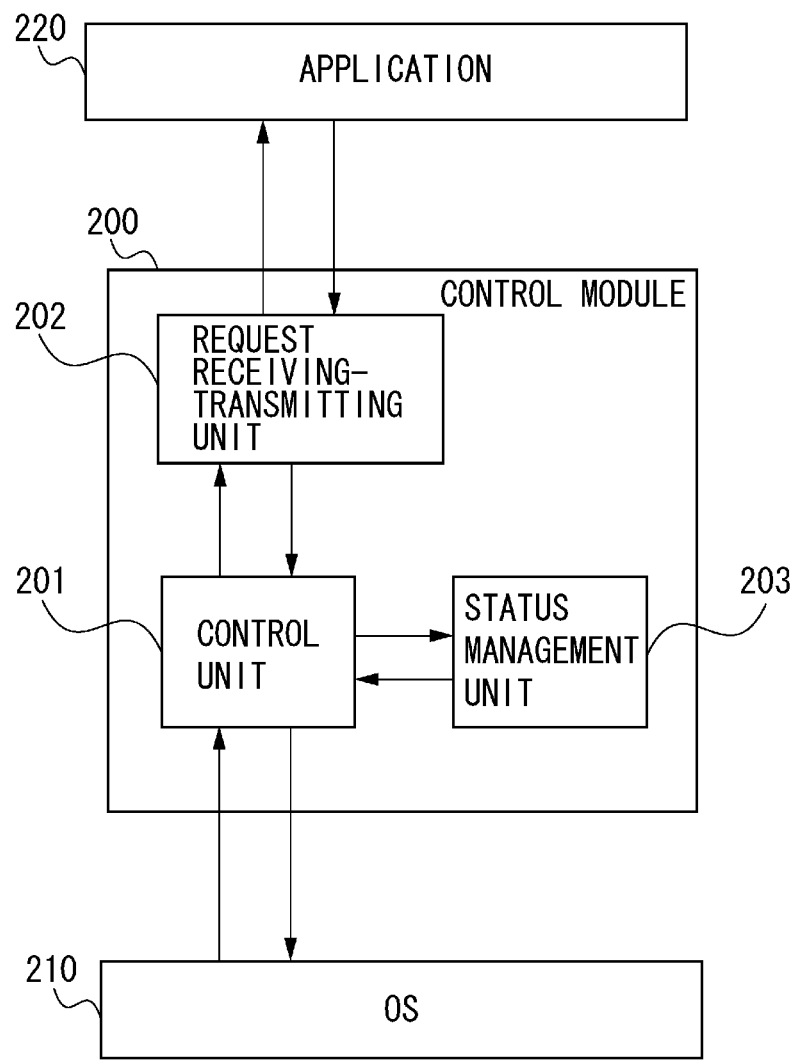
FIG. 2 is a block diagram illustrating an example of a configuration of software executed by a central processing unit (CPU) in the digital multifunction peripheral.

FIG. 2 is a block diagram of an example of a software configuration of the digital multifunction peripheral according to the first embodiment. Referring to FIG. 2, the digital multifunction peripheral includes software modules 200, 201, 202, 203, 210, and 220 that are stored in the HDD 105 or the ROM 106 in the digital multifunction peripheral 10. The software modules are then loaded on the RAM 103 and executed by the CPU 102. The software illustrated in FIG. 2 includes a control module 200, an OS 210, and an application 220.

The control module 200 includes a control unit 201, a request receiving-transmitting unit 202, and a status management unit 203. The control unit 201 receives information from the OS 210 and issues a request to the OS 210. The request receiving-transmitting unit 202 receives a request from the application 220, then demands the control unit 201 to perform a process, and notifies the application 220 of a result of the process performed by the control unit 201. The status management unit 203 manages status information of the card reader 110 and the memory card connected to the card reader 110.

The application 220 is a program for displaying on the operation unit 120 information such as a file name of a file stored in the memory card connected to the card reader 110. Further, the application 220 is a program for reading out from the memory card a file instructed by the user and printing the file via the digital multifunction peripheral.

According to the first embodiment, the card reader 110 is included in the digital multifunction peripheral, so that the card reader 110 and the USB host I/F 104 cannot usually be physically disconnected. The card reader 110 and the USB host I/F 104 are thus constantly physically connected. However, if an external noise such as electrostatic noise enters the card reader 110, the electrical connection between the USB host I/F 104 and the card reader 110 becomes temporarily affected, so that the OS 210 cannot recognize the card reader 110. Such a state is equivalent to the USB host I/F 104 becoming instantaneously physically disconnected from and reconnected to the card reader 110.

When the memory card 114 is inserted or loaded into the card reader 110, the memory card 114 is in a state of being usable by the OS software (i.e., the memory card 114 is in a mounted or connected state). If the user issues a request to cause the memory card 114 to be unusable (i.e., an unmount or disconnect request), first "unusable" processing is performed. The memory card 114 is thus changed to a state in which it can being safely unloadable or withdrawn from the card reader 114 (i.e., become an unmounted or disconnected state).

If the user then withdraws the memory card 114 from the card reader 110, the initial touch of the memory card 114 by the user, intending to withdraw the memory card, may transfer an electrostatic charge to the memory card 114. The memory card 114 may in turn apply the electrostatic charge or noise to the card reader 110. Conventionally, the card reader 110 will then be caused to become instantaneously disconnected from the interface 104, and when the card reader 110 is reconnected, the OS 210 performs a process so that the card reader 110 becomes usable, i.e. is reconnected to the interface 104. The OS 210 thus changes the memory card 114 that is still inserted in the card reader 110 to the usable state (mounted or connected state). As a result, the "unusable" processing request issued by the user for unloading the memory card 114 cannot be received. If the memory card 114 is used by the card reader 104, the memory card 114 cannot be safely withdrawn or unloaded even when the "unusable" processing request (to disconnect the memory card 114 from the card reader 104) is received. The memory card 114 thus returns to the connected state regardless of the user issuing the request to unmount the memory card 114. If the user is unaware that the memory card 114 has returned to the connected state and unloads the memory card 114 manually from the card reader 110, this action, by the user, is processed as a forced withdrawal of the memory card 104 in the usable or connected state. The process performed when the USB host I/F 104 and the card reader 110 are instantaneously disconnected and reconnected due to an electrostatic noise after the user issued a request to disconnect the memory card 114 according to the present embodiment will be described below.

Figure 3:
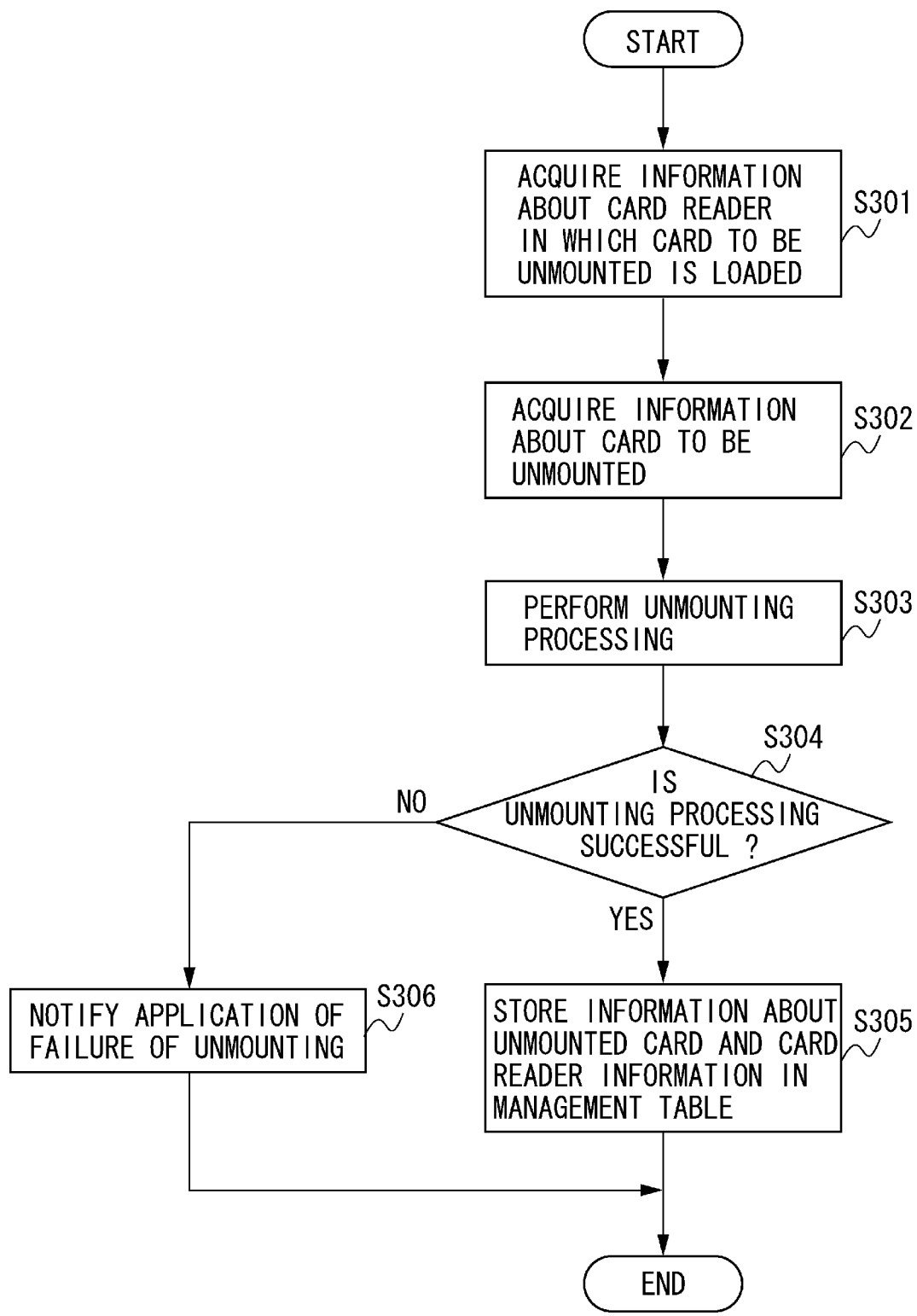
FIG. 3 illustrates a flowchart of an example of unmounting processing in the digital multifunction peripheral.

FIG. 3 is a flowchart illustrating an example of a process performed by the CPU 102 in the digital multifunction peripheral when the user has issued a request to unload or withdraw the memory card 114.

In step S301, the request receiving-transmitting unit 202 of the control module 200 receives a request to perform unmounting processing. The control unit 201 then acquires from the card reader 110, information for identifying the card reader 110 on which the memory card 114 to be disconnected is inserted. Examples of information for identifying the card reader 110 are a vendor identification (ID), a product ID, and a serial number of the card reader 110. Such information is stored in the card reader 110.

In step S302, the control unit 201 acquires from the memory card 114, information identifying the memory card 114 to be disconnected. Examples of the information for identifying the memory card 114 are a serial number, a file allocation table (FAT) volume serial number, and a volume label name. Such information is stored in the memory card 114.

In step S303, the control unit 201 requests the OS 210 to unmount the memory card 114. Upon receiving the unmounting processing request, the OS 210 performs a process for changing the memory card 114 from the usable state (connected state) to the unusable state (disconnected state) and then notifies the control unit 201 of the processing result.

In step S304, the control unit 201 determines whether the result of requesting unmounting processing received from the OS 210 is successful. If the result is successful (YES in step S304), the process proceeds to step S305, and if the result is unsuccessful (NO in step S304). the control unit 201 determines that unmounting processing cannot be performed. The process then prceeds to step S306, and the request receiving-transmitting unit 202 notifies the application 220 that unmounting processing has failed. The process then ends.

In step S305, the control unit 201 requests the status management unit 203 to register, in a storage unit formed as a management table, the information about the card reader 110 acquired in step S301 and the information about the memory card 114 acquired in step S302. The information is stored as information about the memory card 114 which is successfully disconnected. Upon completion of registering the information to the management table, the control unit 201 causes the request receiving-transmitting unit 202 to notify the application 220 that unmounting processing is successful. The process then ends.

A process performed when the card reader 110 in which the disconnected memory card 114 is inserted is instantaneously disconnected by the electrostatic noise will be described below.

Figure 4:
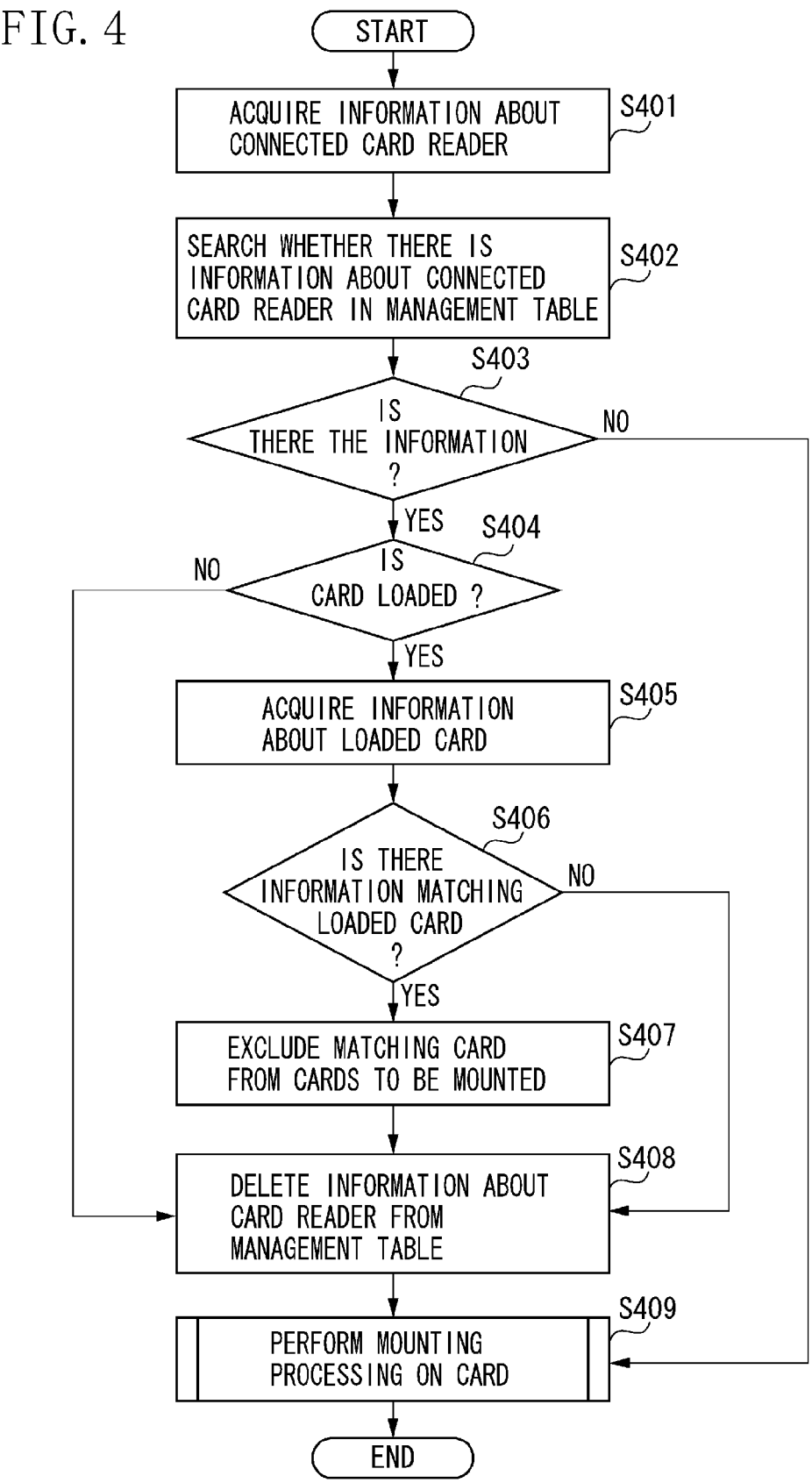
FIG. 4 is a flowchart illustrating an example of mounting processing of a card reader in the digital multifunction peripheral.

FIG. 4 is a flowchart illustrating an example of a process performed by the CPU 102 when static electricity is generated in the card reader 110 after the memory card 114 is disconnected in the digital multifunction peripheral. If static electricity is applied to the card reader 110 loading the memory card 114 that is disconnected by the process illustrated in the flowchart of FIG. 3, the electrically connected USB host I/F 104 and card reader 110 are temporarily disconnected and then reconnected. The process illustrated in the flowchart illustrated in FIG. 4 then starts.

Upon the OS 210 detecting that the card reader 110 is connected, the control unit 201 of the control module 200 receives a notification from the OS 210 of detecting that the card reader is connected, and the process illustrated in FIG. 4 starts. In step S401, the control unit 201, which has received the notification from the OS 210, acquires information about the card reader 110 from the connected card reader 110. The information acquired by the control unit 201 is the same as the information acquired in step S301.

In step S402, the control unit 201 requests the status management unit 203 to search whether information about the card reader 110 acquired in step S401 exists in the management table managed thereby. The information about the disconnected memory cards 114 and the card readers 110 is stored in the management table by the process performed in step S305 illustrated in FIG. 3. Upon receiving the search request, the status management unit 203 searches whether the requested information about the card reader 110 is registered in the management table and notifies the control unit 201 of the search result.

In step S403, the control unit 201 receives the search result from the status management unit 203 and determines whether the information about the connected card reader 110 is registered. If the control unit 201 determines that the information about the connected card reader 110 is registered (YES in step S403), the control unit 201 acquires information about the search result from the status management unit 203. The process then proceeds to step S404. If the search result is registered, it indicates that the card reader 110 which has disconnected the memory card 114 has been reconnected. More specifically, as a connection detection unit, the OS 210 detects that the card reader 110 has been disconnected from the USB host UF 104 for some reason (such as static electricity), from the reconnection of the card reader 110 which is originally not disconnected. On the other hand, if the control unit 201 determines that the search result does not exist (NO in step S403), the control unit 201 requests the OS 210 to mount the memory card inserted into the connected card reader 110. The control unit 201 then notifies the application 220 of the mounting processing result received from the receiving-transmitting unit 202. The process then ends.

In step S404, the control unit 201 determines whether the memory card is inserted into the connected card reader 110. If the memory card is inserted into the card reader 110, the OS 210 can detect the inserted memory card. The control unit 201 performs step S404 by inquiring of the OS 210 whether the memory card is detected. If the memory card is inserted (YES in step S404), the process proceeds to step S405, and if the memory card is not inserted (NO in step S404), the process proceeds to step S408. In step S405, the control unit 201 acquires the information about the memory card inserted into the card reader 110 from the memory card. The acquired information is the same as the information acquired in step S302 illustrated in FIG. 3.

In step S406, the control unit 201 compares the search result acquired in step S403 with the memory card information acquired in step S405 and determines whether there is matching information. If there is matching information, it indicates that unmounting processing illustrated in the flowchart of FIG. 3 has been completed, and that there is a memory card which is still inserted in the card reader 110. If the control unit 201 determines that there is matching information (YES in step S406), the process proceeds to step S407, and if there is no matching information (NO in step S406), the process proceeds to step S408. In step S407, the control unit 201 stores in a temporary storage area in the RAM 103 the memory card determined to match in step S406, i.e., the memory card to remain in the disconnected state, as a memory card which is not to be connected.

In step S408, the control unit 201 requests the status management unit 203 to delete the information about the card reader 110 searched in step S402 from the management table. Upon receiving the deletion request, the status management unit 203 deletes the information from the management table and returns control to the control unit 201. The process then proceeds to step S409. In step S409, the control unit 201 requests the OS 210 to perform normal connection processing on the memory card inserted into the connected card reader 110. The request receiving-transmitting unit 202 then notifies the application 220 of the mounting result. The control unit 201 further requests the OS 210 not to request mounting of the memory card stored in the temporary storage area in step S407. The process of the flowchart thus ends.

According to the above-described process of the flowchart illustrated in FIG. 4, if the card reader 110 is reconnected while the disconnected memory card is inserted therein, the disconnected memory card is prevented from becoming connected. As a result, it prevents execution of mounting processing unintended by the user.

A process performed when the user pulls out the memory card on which mounting processing has been performed will be described below.

FIG. 8 is a flowchart illustrating an example of a process performed by the CPU 102 in the digital multifunction peripheral 10 when the user pulls out the memory card from the card reader 110 according to the first embodiment.

In step S801, upon the OS 210 notifying the control unit 201 of the memory card being pulling out, the control unit 201 identifies the card reader 110 from which the memory card has been pulled out. In step S802, the control unit 201 acquires information on a list of memory cards that are inserted in the card reader 110 identified in step S801 and are currently connected.

In step S803, the control unit 201 identifies information on a list of memory cards inserted into the card reader 110 identified in step S801 from information on a list of memory cards which is stored in the RAM 103. The control unit 201 then compares the identified information with the information acquired in step S802. The RAM 103 stores information on a list of memory cards before the memory card has been pulled out. The information about the memory card that has been pulled out can thus be identified from the result of comparing such information with the list of memory card information acquired in step S802. Upon identifying the information about the memory card that has been pulled out, the control unit 201 updates the information on the list of memory cards, which is stored in the RAM 103, by using the information acquired in step S802.

In step S804, the control unit 201 inquires of the status management unit 203 whether information about the card reader 110 identified in step S801 and the memory card identified in step S803 is registered in the management table. The information about the card readers and the disconnected memory cards is stored in the management table when the memory card successfully disconnected. The status management unit 203 checks whether the information is registered in the management table and notifies the control unit 201 of the check result. If the same information as the card reader 110 identified in step S801 and the memory card identified in step S803 is registered in the management table, it indicates that the memory card pulled out by the user has been correctly disconnected. If the same information is not registered in the management table, it indicates that the memory card pulled out by the user has not been correctly disconnected.

In step S805, if the control unit 201 determines as a result of checking in step S804 that the information is registered in the management table (YES in step S805), the process proceeds to step S806. In step S806, the control unit 201 requests the status management unit 203 to delete the information from the management table. Upon receiving the deletion request, the status management unit 203 deletes the information as requested, and the process ends. On the other hand, if the control unit 201 determines that the information is not registered in the management table (NO in step S805), the process ends.

If static electricity is generated at the instant when the user reloads the correctly disconnected memory card on the card reader 110, the CPU 102 performs the process illustrated in the flowchart of FIG. 4. In such a case, if the information about the connected card reader 110 is registered in the management table, the CPU 102 performs the processes of step S404 to step S407, so that mounting processing of the memory card which is to be connected cannot be performed. However, by performing the process illustrated in the flowchart of FIG. 8, the information is not registered in the management table if the user pulls out the correctly disconnected memory card. As a result, the process illustrated in the flowchart of FIG. 4 proceeds from step S403 to step S409 even when static electricity is generated at the instant when the user reloads the correctly disconnected memory card on the card reader 110. The memory card can thus be correctly connected.

According to the first embodiment, the card reader and the memory card inserted into the card reader are used as an example. However, the present invention is not limited to such an example, and the present invention can be applied to a case where a storage medium such as a USB memory medium is directly connected to the USB host I/F 104. In such a case, the control unit 201 acquires the information for identifying the USB memory medium from the USB memory medium. The control unit 201 acquires the information for identifying the USB memory medium when the electrical connection between the disconnected USB memory medium and the USB host I/F 104 is disconnected by electrostatic noise, and the control unit 201 then detects that the USB memory medium is reconnected. If the connected USB memory medium is disconnected and not removed, the control unit 201 performs control so that the USB memory medium is not connected. As a result, mounting processing is prevented from being performed despite the user's intention.

A second embodiment according to the present invention is different from the first embodiment in that a process is performed after the card reader 110 loading the memory card is instantaneously disconnected by electrostatic noise. More specifically, a portion of the process for causing the card reader 110 to be usable is different. The configurations of the digital multifunction peripheral 10 and the software according to the second embodiment are similar to those illustrated in FIGS. 1 and 2. Further, according to the second embodiment, the card reader 110 is disposed inside the digital multifunction peripheral. The user thus cannot plug and unplug the USB cable connecting the USB host I/F 104 and the card reader 110. The difference from the first embodiment will be described below.

Figure 5:
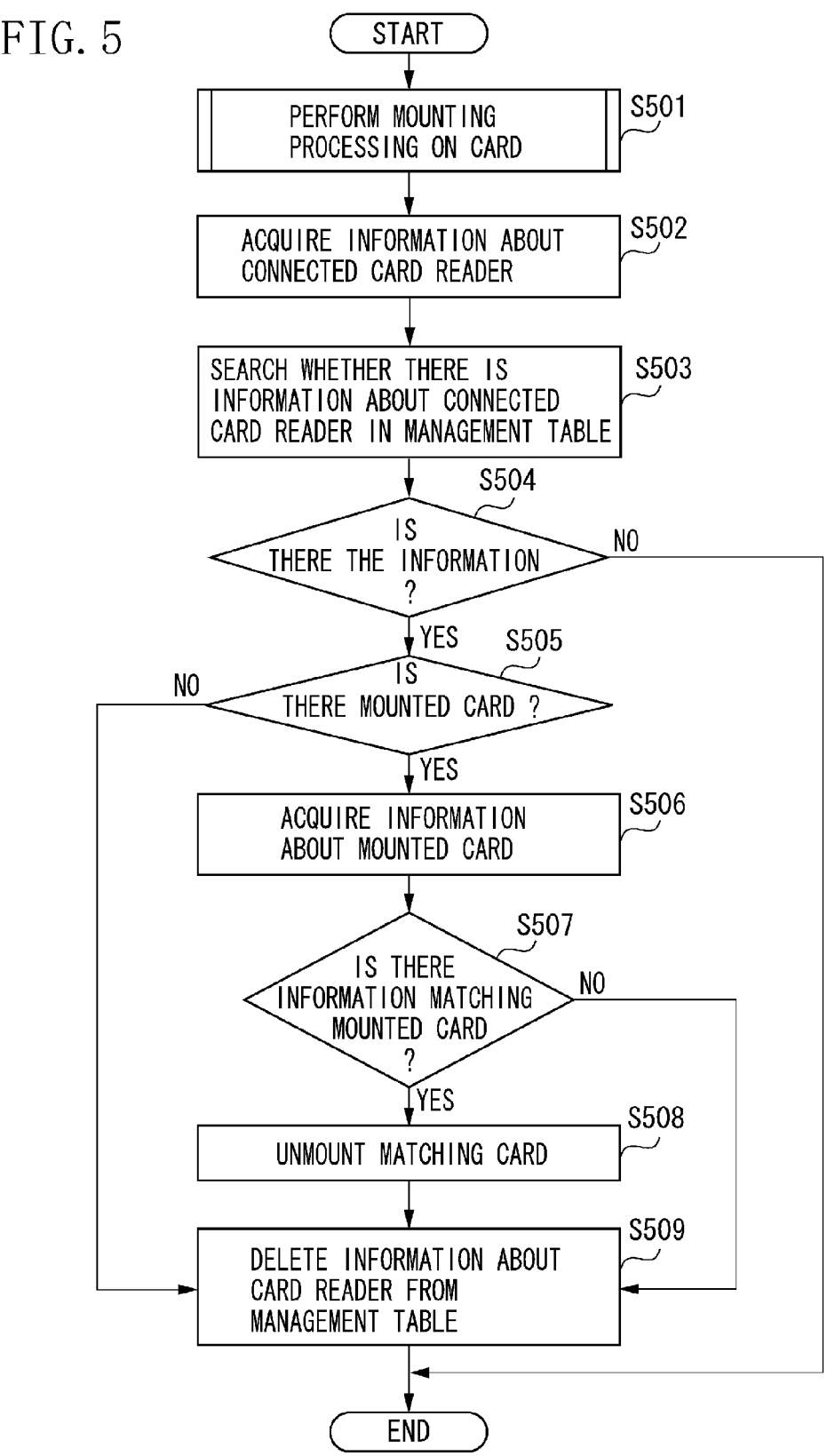
FIG. 5 is a flowchart illustrating another example of mounting processing of the card reader in the digital multifunction peripheral.

FIG. 5 is a flowchart illustrating another example of the process performed by the CPU 102 when static electricity is generated in the card reader 110 after the memory card 114 is disconnected in the digital multifunction peripheral.

The process illustrated by the flowchart of FIG. 3 is executed, so that the memory card 114 is disconnected. Static electricity is then applied to the card reader 110 while the disconnected memory card 114 is inserted into the card reader 110. The electrical connection between the USB host I/F 104 and the card reader 110 is thus temporarily disconnected and reconnected. The process illustrated in the flowchart of FIG. 5 then starts.

Upon detecting that the card reader 110 is connected, the OS 210 notifies the control unit 201 in the control module 200 thereof, and the process illustrated in FIG. 5 starts. In step S501, the control unit 201 receives from the OS 210 the notification on detecting the connection and requests the OS 210 to perform normal mounting processing on the memory card inserted into the card reader 110.

In step S502, the control unit 201 acquires information about the card reader 110 from the connected card reader 110. The information acquired in step S502 is the same as the information acquired in step S301 illustrated in FIG. 3.

In step S503, the control unit 201 request the status management unit 203 to search whether the information acquired in step S502 exists in the management table managed thereby. Upon receiving the search request, the status management unit 203 searches whether the information about the card reader is registered in the management table as requested and then notifies the control unit 201 of the search result.

In step S504, the control unit 201 receives the search result from the status management unit 203 and determines whether the search result is registered in the management table. If the control unit 201 determines that the information about the connected card reader is registered (YES in step S504), the control unit 201 acquires the information about the search result from the status management unit 203. The process then proceeds to step S505. On the other hand, if the control unit 201 determines that the information about the connected card reader is not registered (NO in step S504), the control unit 201 causes the request receiving-transmitting unit 202 to notify the application 202 of the mounting processing result. The process then ends.

In step S505, the control unit 201 checks whether the connected memory card exists. If the control unit 201 determines that the connected memory card exists (YES in step S505), the process proceeds to step S506. If the control unit 201 determines that the connected memory card does not exist (NO in step S505), the process proceeds to step S509. In step S506, the control unit 201 acquires the information about the connected memory card from the memory card. The information acquired in step S506 is the same as the information acquired in step S302 illustrated in FIG. 3.

In step S507, the control unit 201 confirms whether there is memory card information acquired in step S506 that matches the search result acquired in step S504. If the control unit determines that there is matching information (YES in step S507), the process proceeds to step S508. If the control unit 201 determines that there is no matching information (NO in step S507), the process proceeds to step S509. In step 508, the control unit 201 requests the OS 210 to perform unmounting processing on the memory card which has been determined to match in step S507. In other words, the control unit 201 requests the OS 210 to unmount the memory card which has been connected in step S501 even when it is to remain in the disconnected state. The OS 210 then performs unmounting processing according to the request from the control unit 201. The control unit 201 then receives a notification of the unmounting processing result from the OS 210, and the process proceeds to step S509. In step S509, the control unit 201 requests the status management unit 203 to delete the information about the card reader searched in step S503 from the management table. Upon receiving the deletion request, the status management unit 203 deletes the information from the management table and returns control to the control unit 201. The process of the flowchart then ends.

As described above, according to the second embodiment, when the memory card which is to be in the disconnected state is again connected due to static electricity, unmounting processing is automatically performed. As a result, the memory card is prevented from becoming connected despite the user's intention.

According to the second embodiment, the card reader and the memory card inserted into the card reader are used as an example. However, the present invention is not limited to such an example, and the present invention can be applied to a case where a storage medium such as a USB memory medium is directly connected to the USB host I/F 104. In such a case, the control unit 201 acquires the information for identifying the USB memory medium from the USB memory medium. The control unit 201 acquires the information for identifying the USB memory medium when the electrical connection between the disconnected USB memory medium and the USB host I/F 104 is disconnected by electrostatic noise, and the control unit 201 then detects that the USB memory medium is reconnected. If the connected USB memory medium is disconnected and not removed, the control unit 201 performs control so that the USB memory medium is not connected. As a result, mounting processing is prevented from being performed despite the user's intention.

A third embodiment according to the present invention is different from the first and second embodiments in that a plurality of card readers are arranged external to the digital multifunction peripheral.

Figure 6:
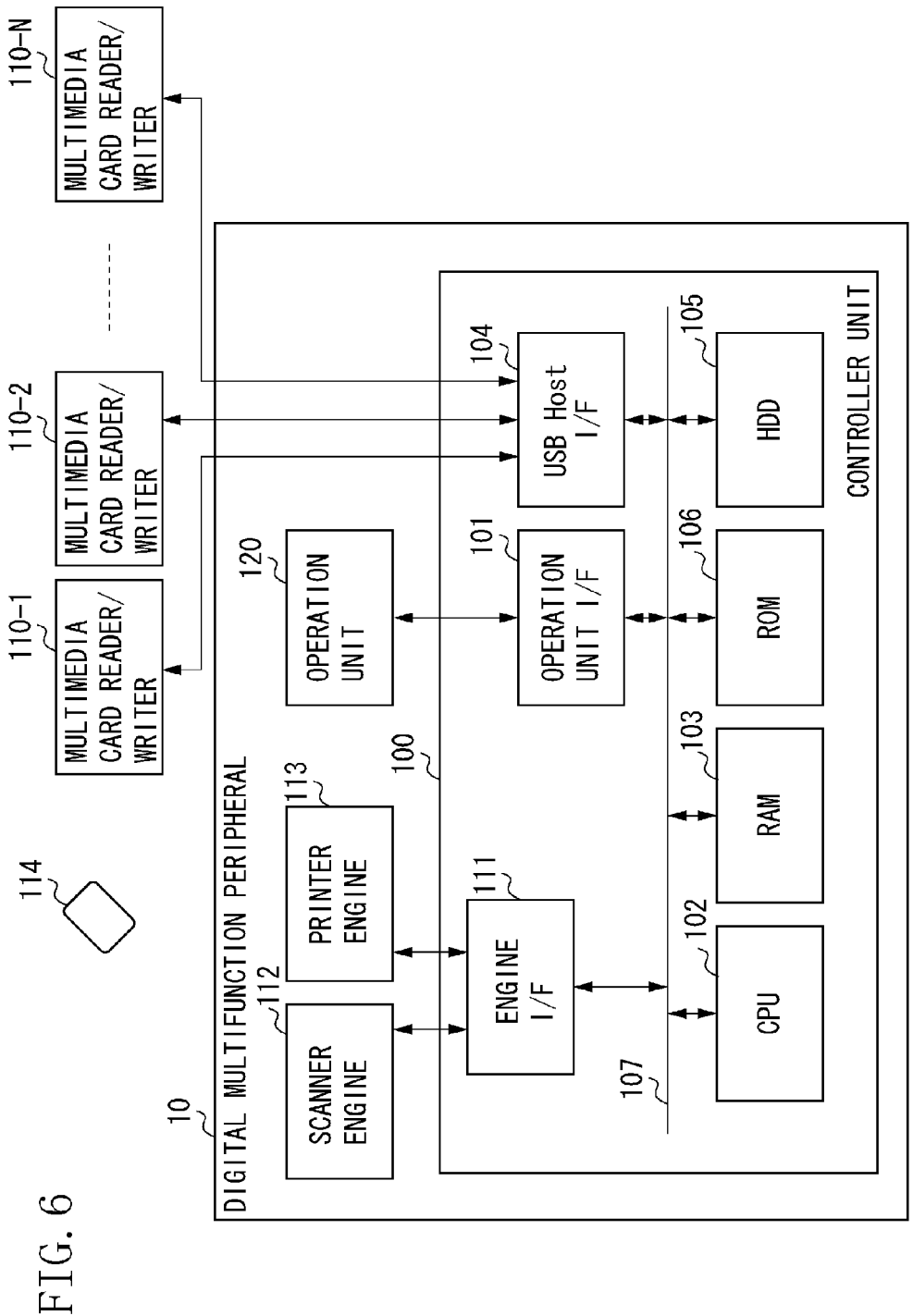
FIG. 6 is a block diagram illustrating another example of a configuration of the digital multifunction peripheral.

FIG. 6 illustrates an example of a configuration of the digital multifunction peripheral and card readers according to the third embodiment. The components which are the same as those illustrated in FIG. 1 are assigned the same reference numbers, and description will be omitted. The differences between FIG. 1 and FIG. 6 are that there is a plurality of card readers (110-1, 110-2, etc., and 110-N, hereinafter to be collectively referred to as card reader 110) in FIG. 6, and the card readers are disposed external to the digital multifunction peripheral. The user can thus remove the card reader 110 from the USB host I/F 104 in the configuration illustrated in FIG. 6. In FIG. 6, the device connected to the USB host I/F 104 may be a USB device other than the card reader. The software configuration of the digital multifunction peripheral 10 according to the third embodiment is as illustrated in FIG. 2.

Further, the processes performed when the card reader 110 is disconnected and is connected according to the third embodiment are different from those performed in the first and second embodiments. The process performed when the card reader 110 is disconnected is not described according to the first and second embodiments. However, this does not indicate that no process is performed. Since it is a generally performed process when the card reader is disconnected, description is omitted.

Furthermore, in the process performed when the card reader 110 is connected according to the third embodiment, the information on the list of card readers is stored after performing the processes according to the first and second embodiments (i.e., after step S409 illustrated in FIG. 4 and step S509 illustrated in FIG. 5). More specifically, the control unit 201 acquires the information on the list of connected card readers and stores the information in the RAM 103 as the information on the list of card readers.

Figure 7:
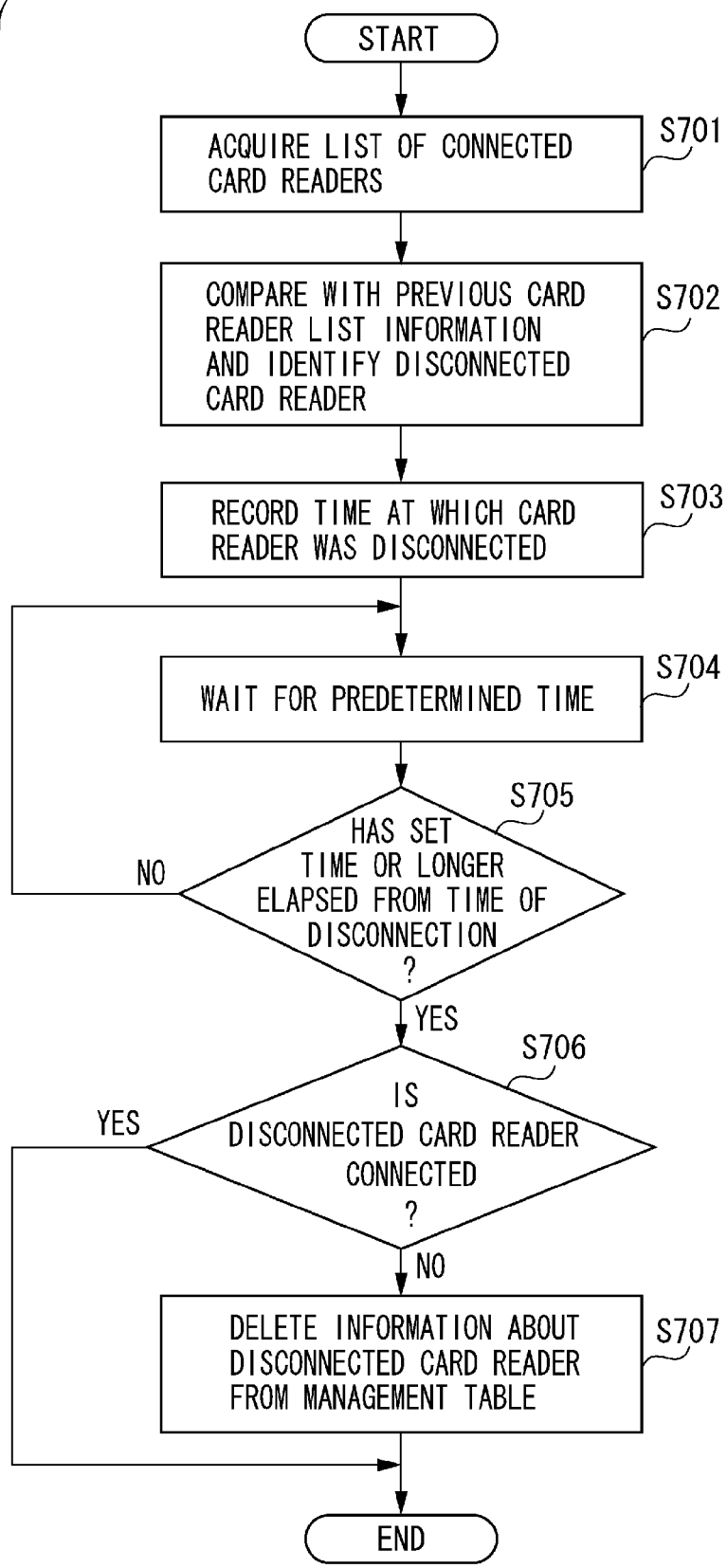
FIG. 7 is a flowchart illustrating an example of a process performed when the card reader is disconnected in the digital multifunction peripheral.

FIG. 7 is a flowchart illustrating a process performed by the CPU 102 when the digital multifunction peripheral 10 and one of the card readers 110 are disconnected according to the third embodiment. The OS 210 notifies the control unit 201 of the disconnection of the card reader. In step S701, the control unit 201 then acquires from the OS 210 the list of card readers that are currently connected.

In step S702, the control unit 201 compares the list of card readers acquired in step S701 with the information on the list of card readers stored in the RAM 103 before one of the card readers 110 is disconnected. The control unit 201 then identifies the disconnected card reader from the difference between the lists. The control unit 201 updates the information on the list of card readers in the RAM 103 using the list acquired in step S701.

In step S703, the control unit 201 acquires from the OS 210 the time at which the card reader was disconnected and stores therein. In step S704, the control unit 201 waits for a predetermined time after acquiring the time of the disconnection from the OS 210. In step S705, the control unit 201 checks whether a set time or longer has elapsed from the time acquired in step S703. The user may set the waiting time and the set time, or a fixed value may be used. It is desirable that the set time is longer than the time taken for the card reader to be instantaneously disconnected by static electricity, and shorter than the time necessary for the user to unplug and plug the connection.

If the control unit 201 determines that the set time or longer time has not elapsed (NO in step S0705), the process returns to step S704. On the other hand, if the control unit 201 determines that the set time or longer time has elapsed (YES in step S0705), the process proceeds to step S706. In step S706, the control unit 201 re-checks the card reader. More specifically, the control unit 201 checks whether the card reader identified in step S702 is reconnected. If the control unit 201 determines that the card reader is reconnected (YES in step S706), the control unit 201 determines that the disconnection is instantaneous due to electrostatic noise. The control unit 201 thus does not perform any other process, and the process ends. If the control unit 201 determines that the card reader is not reconnected (NO in step S706), it is assumed that the user removed the card reader without disconnecting the card reader. In such a case, the process proceeds to step S707, and the control unit 201 requests the status management unit 203 to delete the information about the card reader identified in step S702. Upon receiving the request, the status management unit 203 searches the management table for the information about the card reader and deletes the information. The status management unit 203 then sends a response to the control unit 201, and when the control unit 201 receives the response, the process ends.

According to the flowchart illustrated in FIG. 7, the information about the card reader in which a predetermined time has elapsed from being disconnected is deleted from the management table. Since the information is deleted from the management table, the memory card is correctly connected even when the user intentionally removes the card reader while the disconnected memory card is inserted into the card reader and then reconnects the card reader.

As described above, according to the third embodiment, if it is determined that the disconnection is not instantaneous as when caused by electrostatic noise, it is determined that the user intentionally reconnected the card reader. Mounting processing is thus performed on the memory card when the card reader is connected. As a result, the memory card is in the connected state as intended by the user.

According to the first, second, and third embodiments, the digital multifunction peripheral 10 and the card reader 110 are connected via the USB interface. However, the digital multifunction peripheral 10 and the card reader 110 may be connected via other types of interfaces. For example, Institute of Electrical and Electronics Engineers (IEEE) 1394 interface may be employed, or other types of plug-and-play interfaces may be employed. In such a case, the USB host I/F 104 illustrated in FIGS. 1 and 6 is replaced by an interface compliant with other types of interfaces.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-149801 filed Jun. 24, 2009, which is hereby incorporated by reference herein in its entirety.

What is claimed is:

1. An information processing apparatus comprising:
an interface unit configured to electrically connect with a peripheral device capable of receiving a memory storage medium inserted into the peripheral device and electrically connected thereto;
a connection detection unit configured to detect an interruption in the electrical connection between the interface unit and the peripheral device;
a control unit configured to prevent the memory storage medium, once unmounted and inserted into the peripheral device, from being mounted again after the connection detection unit detects the interruption; and
a storage unit configured to store information for identifying the memory storage medium that is prevented from being mounted again by the control unit and information for identifying the peripheral device in which the storage medium is inserted,
wherein the control unit determines, if the memory storage medium inserted into the peripheral device detected by the connection detection unit is the memory storage medium which is identified by information stored in the storage unit, that the memory storage medium, which is prevented from being mounted by the control unit, is inserted into the peripheral device detected by the connection detection unit,
wherein the control unit detects that the memory storage medium has been removed from the peripheral device, and
wherein the storage unit deletes information for identifying the memory storage medium and for identifying the peripheral device, according to the control unit detecting that the storage medium has been removed from the peripheral device.

2. The information processing apparatus according to claim 1, further comprising:
a user interface configured to receive a request to unmount the memory storage medium,
wherein the control unit prevents the memory storage medium from being mounted again after a request to unmount the memory storage medium has been received via the user interface.

3. The information processing apparatus according to claim 1, wherein the interface unit is a USB (universal serial bus) interface.

4. A method for controlling an information processing apparatus which comprises an interface unit configured to electrically connect with a peripheral device capable of receiving a memory storage medium inserted into the peripheral device and electrically connected thereto, the method comprising:
detecting an interruption in the electrical connection between the interface unit and the peripheral device;

preventing the memory storage medium, once unmounted and inserted into the peripheral device, from being mounted again after detection of the interruption;

storing information for identifying the memory storage medium that is prevented from being mounted again and information for identifying the peripheral device in which the storage medium is inserted;

determining, if the memory storage medium inserted into the peripheral device is the memory storage medium which is identified by the stored information, that the memory storage medium, which is prevented from being mounted, is inserted into the peripheral device;

detecting that the memory storage medium has been removed from the peripheral device; and deleting the information for identifying the memory storage medium and for identifying the peripheral device, according to detection that the storage medium has been removed from the peripheral device.

5. The method for controlling an information processing apparatus according to claim 4, the information processing apparatus further comprises a user interface which receives a request to remove the memory storage medium from the peripheral device;

the method further comprising:

preventing the memory storage medium from being mounted again after a request to unmount the memory storage medium has been received via the user interface.

6. A non-transitory computer-readable medium storing a computer program for causing a computer to execute a method for controlling an information processing apparatus which comprises an interface unit configured to electrically connect with a peripheral device capable of receiving a memory storage medium inserted into the peripheral device and electrically connected thereto, the method comprising:

detecting an interruption in the electrical connection between the interface unit and the peripheral device;

preventing the memory storage medium, once unmounted and inserted into the peripheral device, from being mounted again after detection of the interruption;

storing information for identifying the memory storage medium that is prevented from being mounted again and information for identifying the peripheral device in which the storage medium is inserted;

determining, if the memory storage medium inserted into the peripheral device is the memory storage medium which is identified by the stored information, that the memory storage medium, which is prevented from being mounted, is inserted into the peripheral device;

detecting that the memory storage medium has been removed from the peripheral device; and deleting the information for identifying the memory storage medium and for identifying the peripheral device, according to detection that the storage medium has been removed from the peripheral device.

* * * * *